(12) United States Patent
Rietman et al.

(10) Patent No.: US 8,956,538 B2
(45) Date of Patent: *Feb. 17, 2015

(54) PHONONIC CRYSTAL DESALINATION SYSTEM AND METHODS OF USE

(75) Inventors: Edward A. Rietman, Nashua, NH (US); Bart Lipkens, Hampden, MA (US)

(73) Assignee: FloDesign Sonics, Inc., Wilbraham, MA (US)

(*) Notice: Subject to any disclaimer, the term of this patent is extended or adjusted under 35 U.S.C. 154(b) by 458 days.

This patent is subject to a terminal disclaimer.

(21) Appl. No.: 13/162,463

(22) Filed: Jun. 16, 2011

(65) Prior Publication Data

US 2011/0309020 A1  Dec. 22, 2011

Related U.S. Application Data

(60) Provisional application No. 61/355,421, filed on Jun. 16, 2010.

(51) Int. Cl.
| | |
|---|---|
| *B01D 63/00* | (2006.01) |
| *C02F 1/44* | (2006.01) |
| *B01D 29/00* | (2006.01) |
| *C02F 9/00* | (2006.01) |
| *C02F 1/00* | (2006.01) |

(Continued)

(52) U.S. Cl.
CPC .............. *C02F 1/441* (2013.01); *B01D 63/06* (2013.01); *C02F 1/36* (2013.01); *B01D 2313/24* (2013.01); *B01D 2313/36* (2013.01)
USPC .............. 210/321.87; 210/321.78; 210/252; 210/253; 210/255; 210/651; 210/192; 210/259; 210/335; 210/748.01; 210/748.02; 210/748.03; 210/748.04; 210/748.05; 210/321.8; 210/321.88; 210/321.89; 422/20; 422/21; 422/127; 422/128

(58) Field of Classification Search
USPC .............. 210/748.01, 748.02, 785, 748.05, 210/321.6, 321.69, 321.78, 321.79, 321.8, 210/321.87, 321.88, 321.89, 323.2, 331
See application file for complete search history.

(56) References Cited

U.S. PATENT DOCUMENTS

| | | | | |
|---|---|---|---|---|
| 4,158,629 A | * | 6/1979 | Sawyer | 210/137 |
| 4,165,273 A | | 8/1979 | Azarov et al. | |

(Continued)

FOREIGN PATENT DOCUMENTS

WO   WO-2009111276 A1   9/2009

OTHER PUBLICATIONS

Kesting, R. E. (1965), Semipermeable membranes of cellulose acetate for desalination in the process of reverse osmosis. I. Lyotropic swelling of secondary cellulose acetate. J. Appl. Polym. Sci., 9: 663-688.*

(Continued)

*Primary Examiner* — David C Mellon
*Assistant Examiner* — Pranav Patel
(74) *Attorney, Agent, or Firm* — Richard M. Klein; Fay Sharpe LLP

(57) ABSTRACT

Disclosed herein are systems and methods for desalination of salt water based on an engineered acoustic field that causes constructive and destructive interference at pre-computed spatial positions. The engineered acoustic field can cause high-pressure and low-pressure regions where desalination membranes are located. The induced pressure from the acoustic field can force pure water through the membranes leaving ionic and dissolved molecular species behind.

7 Claims, 10 Drawing Sheets

(51) Int. Cl.
  *C02F 1/34*  (2006.01)
  *C02F 1/48*  (2006.01)
  *B01D 63/06* (2006.01)
  *C02F 1/36*  (2006.01)

(56) References Cited

U.S. PATENT DOCUMENTS

| | | | |
|---|---|---|---|
| 5,225,089 | A | 7/1993 | Benes et al. |
| 5,431,817 | A * | 7/1995 | Braatz et al. ............... 210/490 |
| 6,487,095 | B1 | 11/2002 | Malik et al. |
| 2002/0134734 | A1 | 9/2002 | Campbell et al. |
| 2003/0230535 | A1 | 12/2003 | Affeld et al. |
| 2004/0016699 | A1* | 1/2004 | Bayevsky ................... 210/636 |
| 2007/0272618 | A1 | 11/2007 | Gou et al. |
| 2010/0000945 | A1 | 1/2010 | Gavalas |

OTHER PUBLICATIONS

B. Lipkens, J. Dionne, A. Trask, B. Szczur, A. Stevens, E. Rietman, "Separation of micron-sized particles in macro-scale cavities by ultrasonic standing waves," Presented at the International Congress on Ultrasonics, Santiago, Jan. 11-17, 2009.

B. Lipkens, J. Dionne, A. Trask, B. Szczur, and E. Rietman, "Prediction and measurement of particle velocities in ultrasonic standing waves," J. Acoust. Soc. Am. 124, No. 4, pp. 2492 (A) 2008.

B. Lipkens, J. Dionne, M. Costolo, and E. Rietman, "Frequency sweeping and fluid flow effects on particle trajectories in ultrasonic standing waves," Acoustics 08, Paris, Jun. 29-Jul. 4, 2008.

B. Lipkens, M. Costolo, and E. Rietman, "The effect of frequency sweeping and fluid flow on particle trajectories in ultrasonic standing waves", IEEE Sensors Journal, vol. 8, No. 6, pp. 667-677, 2008.

Castro, V. E., "Tunable gap and quantum quench dynamics in bilayer graphene"; Jul. 13, 2010, Mathematica Summer School.

Garcia-Lopez, "Enhanced Acoustic Separation of Oil-Water Emulsion in Resonant Cavities", The Open Acoustics Journal, pp. 66-71, 2008.

International Search Report and Written Opinion dated Dec. 20, 2011, for corresponding PCT application No. PCT/US2011/032181.

International Search Report and Written Opinion dated Feb. 27, 2012, for PCT application No. PCT/US2011/040787.

L. P. Gor'kov, "On the forces acting on a small particle in an acoustical field in an ideal fluid," Soy. Phys. Dokl., vol. 6, pp. 773-775, 1962.

Meribout, et al., "An Industrial-Prototype Acoustic Array for Real-Time Emulsion Layer Detection in Oil Storage Tanks", IEEE Sensors Journal, vol. 9, No. 12, Dec. 2009.

Pangu, et al., "Droplet transport and coalescne kinetecs in emulsions subjected to acoustic fields", Ultrasonics 46, pp. 289-302 (2007).

Ponomarenko et al. "Density of states and zero Landau level probed through capacitance of graphene"; Nature Nanotechnology Letters; Jul. 5, 2009; DOI: 10.1038/NNANO.2009.177.

Sony News Release: <http://www.sony.net/SonyInfo/News/Press/201010/10-137E/index.html>, Oct. 7, 2010, pp. 1-5.

\* cited by examiner

PHONONIC CRYSTAL DESALINATION SYSTEM AND METHODS OF USE

CROSS-REFERENCE TO RELATED APPLICATIONS

This application claims the benefit of priority under 35 U.S.C. §119 to U.S. Provisional Patent Application Ser. No. 61/355,421, filed on Jun. 16, 2010, entitled, "Phononic Crystal Desalination System and Methods of Use", the entire disclosure of which is incorporated by reference herein.

BACKGROUND

The basis for phononic crystals dates back to Isaac Newton who imagined that sound waves propagated through air in the same way that an elastic wave would propagate along a lattice of point masses connected by springs with an elastic force constant E, the force constant being identical to the modulus of the material. The field of phononic crystals and our theoretical understanding of them have steadily grown since that time (see, for example, Joannopoulos, R. D. Meade and J. N. Winn, *Photonic Crystals, Molding the Flow of Light* (Princeton University Press, Princeton (1995); Garcia et al., "Theory for Tailoring Sonic Devices: Diffraction Dominates over Refraction," *Phys. Rev. E* 67, 046606 (2003); Kushwaha and P. Halevi, "Band-gap Engineering in Periodic Elastic Composites," *Appl. Phys. Lett.* 64(9):1085-1087 (1994); Lai et al. "Engineering Acoustic Band Gaps," Appl. Phys. Lett. 79(20): 3224-3226 (2001); Sigmund and Jensen "Systematic Design of Phononic Band-Gap Materials and Structures by Topology Optimization," *Phil. Trans. R. Soc. Lond. A* 361: 1001-1019 (2003), Caballero et al. "Large Two-Dimensional Sonic Band Gaps," Phys. Rev. E 60(6):R6316-R6319 (1999); and Sliwa and Krawczyk "The Effect of Material Parameters Values on the Relation Between Energy Gap Width and the Scattering Symmetry in Two-Dimensional Phononic Crystals," arXiv:cond-mat/05022 (2005).

SUMMARY

Disclosed herein are methods, systems, apparatus, and/or articles as described and/or illustrated herein. In an implementation, disclosed is a system and method for desalination of salt water based on an engineered acoustic field that causes constructive and destructive interference at pre-computed spatial positions. The engineered acoustic field can cause high-pressure and low-pressure regions where desalination membranes are located. The induced pressure from the acoustic field can force pure water through the membranes leaving ionic and dissolved molecular species behind.

Disclosed herein is an apparatus including an array of tubes, wherein each tube is surrounded by a membrane and wherein the tubes are parallel to each other; a flow chamber; and one or more acoustic transducers. A fluid can flow through the flow chamber in a direction of flow. The array of tubes can also be positioned in the flow chamber so that the hollow portions of the tubes are in the direction of flow. Also, the spaces between each of the tubes in the flow chamber can form an interstitial region. Further, the acoustic transducers can be positioned so that they touch a fluid present in the flow chamber.

The membrane can include a desalination polymer. The tubes can be made up of a porous material. The array of tubes can be arranged in a hexagonal array. The wall of the flow chamber can include the acoustic transducer. The apparatus can also include two transducers. Specifically, the two transducers can cover an entire boundary or side of the flow chamber. Further, the array of tubes can be packed into a phononic crystal or a phononic crystal system.

Also disclosed herein is a method of desalinating water. The method includes creating an engineered acoustic field, wherein the engineered acoustic field creates high pressure and low pressure regions; providing a desalination membrane; and positioning a high pressure region so as to force water through the desalination membrane thereby separating solutes from the water thereby desalinating the water.

The method can also include providing an array of tubes, wherein each tube is surrounded by a membrane and wherein the tubes are parallel to each other; a flow chamber; and one or more acoustic transducers. A fluid can flow through the flow chamber in a direction of flow. The array of tubes can also be positioned in the flow chamber so that the hollow portions of the tubes are in the direction of flow. Also, the spaces between each of the tubes in the flow chamber can form an interstitial region. Further, the acoustic transducers can be positioned so that they touch a fluid present in the flow chamber.

The water to be desalinated can present in the interstitial region and the engineered acoustic field be oriented to force the water to be desalinated through the desalination membranes into the tubes. Also, the water to be desalinated can be present in the tubes and the engineered acoustic field be oriented to force the water to be desalinated through the desalination membranes into the interstitial region. Further, the array of tubes can be packed into a phononic crystal or a phononic crystal system.

Also disclosed herein is an apparatus including a guide having a two-dimensional cubic or hexagonal configuration of circular rods, wherein a phononic crystal system is built within the guide; and an acoustic pressure source positioned at a first side of the guide. The acoustic pressure source can transmit acoustic energy and can be positioned such that a box exists outside the opposite side of the guide, wherein the acoustic energy is integrated.

The circular rods can be between about 3.175 and about 9.525 mm in diameter. The circular rods can be embedded in urethane. The crystal system can surrounded by urethane. The circular rods can include a material selected from alumina, stainless steel, aluminum, nylon and porous ceramic. The acoustic energy can be of a frequency between about 10 and about 200 kHz.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Generally speaking the figures are not to scale in absolute terms or comparatively but are intended to be illustrative of claimed features. Also, relative placement of features and elements may be modified for the purpose of illustrative clarity. Many of the figures show the components in schematic for the purpose of simplicity and are not intended to specifically show the design of the components or how they are coupled together.

DETAILED DESCRIPTION

Described herein are systems and methods for desalination and the separation of dissolved metals, salts, and organics from water by exploiting phenomena observed in phononic crystals. In particular, described herein is a method and system using phononic crystals to produce ultrasonic or acoustic standing waves at key spatial locations within the crystal where the acoustic pressure differential is sufficient to force water through a polymeric membrane at that location, and leave a concentrated brine solution behind. The high pressure differential at eighteen modes in the crystal forces pure water through the membrane leaving a concentrated brine solution and the ionic species behind in order to desalinate water. The systems and methods for desalination by membrane distillation described herein provide many advantages, for example, pure desalinated water with very low power requirements.

The elastic force constant is of key importance and is a key factor for acoustic band-gap engineering in impedance mismatch between periodic elements including the crystal and the surrounding medium. When an advancing wave-front meets a material with very high impedance it will tend to increase its phase velocity through that medium. Likewise, when an advancing wave-front meets a low impedance medium it will slow down.

For inhomogenous solids, the wave equation is given by $$\frac{\partial^2 u_j^i}{\partial t^2} = \frac{1}{\rho_1} \left\{ \frac{\partial}{\partial x_i}\left(\lambda \frac{\partial u_l^i}{\partial x_l}\right) + \frac{\partial}{\partial x_l}\left[\mu\left(\frac{\partial u_j^i}{\partial x_l} + \frac{\partial u_l^i}{\partial x_i}\right)\right]\right\}.$$

Here, $u^i$ is the $i^{th}$ component displacement vector. The subscript j is in reference to the medium (medium 1 or medium 2); $\lambda$, $\mu$ are the Lame coefficients, $\rho$ is the density, and the longitudinal and transverse speed of sound are given by $$c_l = \sqrt{(\lambda + 2\mu)/\rho}$$

$$c_t = \sqrt{\mu/\rho}.$$

The Lame coefficients can be expressed as Young's modulus E.

$E_t = \rho c_t^2 = \mu$ $E_l = \rho c_l^2 = \lambda + 2\mu$

Young's modulus has importance to elastic vibrations in lattices. Upon performing a numerical survey of materials, lattice spacing, packing arrangements, and crystal orientations, it can be observed that as the Young's modulus increases, the width of the first (lowest frequency) band-gap also increases. This trend can be observed for both cubic (X and M direction) and hexagonal crystals (K and M directions) at several filling fractions and rod diameters.

Figure 1:
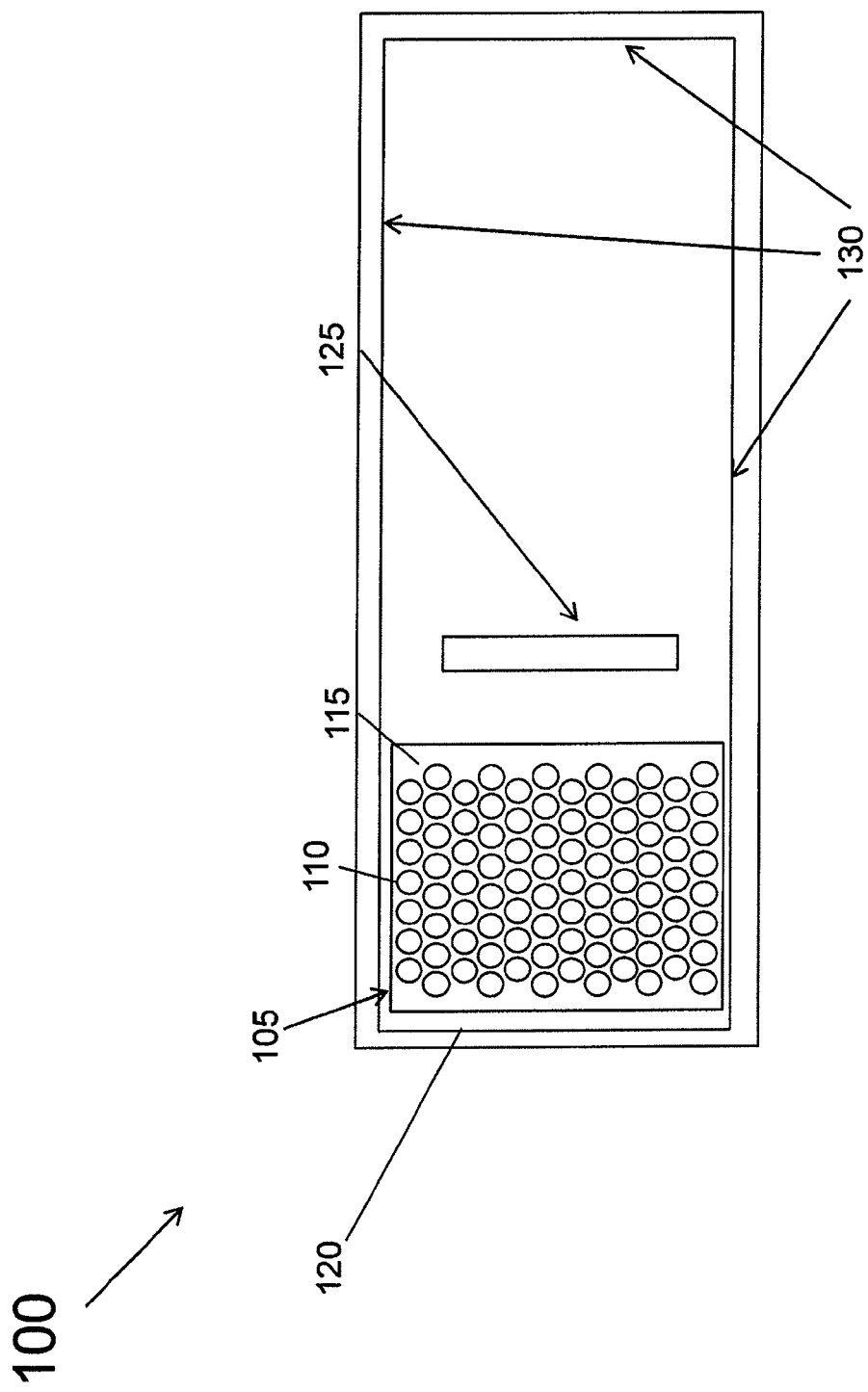
FIG. 1 is a schematic configuration for computing the energy gap in various phononic crystals.

The band-gaps in phononic crystals can be a function of material composition, lattice spacing, crystal-packing arrangement, crystal orientation, and/or size of the elements in the crystal. FIG. 1 is a schematic of a configuration that can be used for computing the energy gap in various phononic crystals. As shown in FIG. 1, a guide 100 having a two-dimensional cubic or hexagonal configuration of circular rods 110 can be used to design and build the basic crystal system 105. The guide 100 can include rods 110 embedded in a urethane impedance 115 matched with water, for example, ($\rho$=1000 kg/m³; c=1497 m/sec). To one side of the crystal system 105 can be an acoustic pressure source 120, for example to produce plane waves. On an opposite side of the crystal system 105 can be an imaginary box 125 used for integration. In this region, the acoustic energy for preparing the transmission spectra can be integrated. The boundaries 130, except for the pressure source 120, can be water impedance. In a variation, the crystal system 105 is approximately 3.5 cm×5 cm surrounded by the urethane impedance 115.

The configuration, diameter, and material of the rods 110 as well as the filling fraction can all vary. As mentioned, the rods 110 can be in a two-dimensional cubic or hexagonal configuration. The rod diameter used can be, for example, 3.175 mm (0.125"), 6.35 mm (0.25"), and 9.525 mm (0.375"). The filling fractions used can be, for example, 0.90699, 0.403066, and 0.29613. Using all three rod diameters and all three filling fractions results in nine possible combinations. For the cubic crystals, X and M directions can be used. For the hexagonally-packed crystals, K and M directions can be used. The material of the rods 110 can vary, including alumina ($\rho$=3860 kg/m³; c=10520 m/sec; E=3.61×10¹¹ Pa), stainless steel ($\rho$=7850 kg/m³; c=5790 m/sec; E=1.03×10¹¹ Pa), aluminum ($\rho$=2700 kg/m³; c=6420 m/sec; E=6.9×10¹⁰ Pa) and nylon ($\rho$=1130 kg/m³; c=2675 m/sec; E=2.4×10⁰⁹ Pa) or other appropriate material. In an embodiment, the material is a porous ceramic. For each rod material combination, the acoustic properties for eighteen different crystals/orientations can be analyzed. As mentioned, the frequency can vary. The frequency can be between about 10 kHz to about 200 kHz. In a variation, X and M directions can be used in cubic and K and M directions in hexagonal polyester ($\rho$=1350 kg/m³; c=2100 m/sec; E=4.41×10⁹ Pa)) and graphite ($\rho$=2200 kg/m³; c=3310 m/sec; E=2.41×10¹⁰ Pa) packed in urethane. The width and center frequency for the first band gap can be a function of the Young's modulus. The lattice spacing can be a function of the filling fraction and the rod diameter. Band gaps for materials having a modulus nearing that of the impedance will not as pronounced. For example, the band gap for nylon will not be as pronounced as alumina, steel or aluminum.

The systems and methods for desalination of water described herein incorporate an engineered acoustic field that can cause constructive and destructive interference at spatial positions identified using the modeling system described above. The engineered acoustic field can cause high-pressure and low-pressure regions where desalination membranes can be positioned. The induced pressure from the acoustic field can force pure water through the membranes leaving ionic and dissolved molecular species behind.

Figure 2:
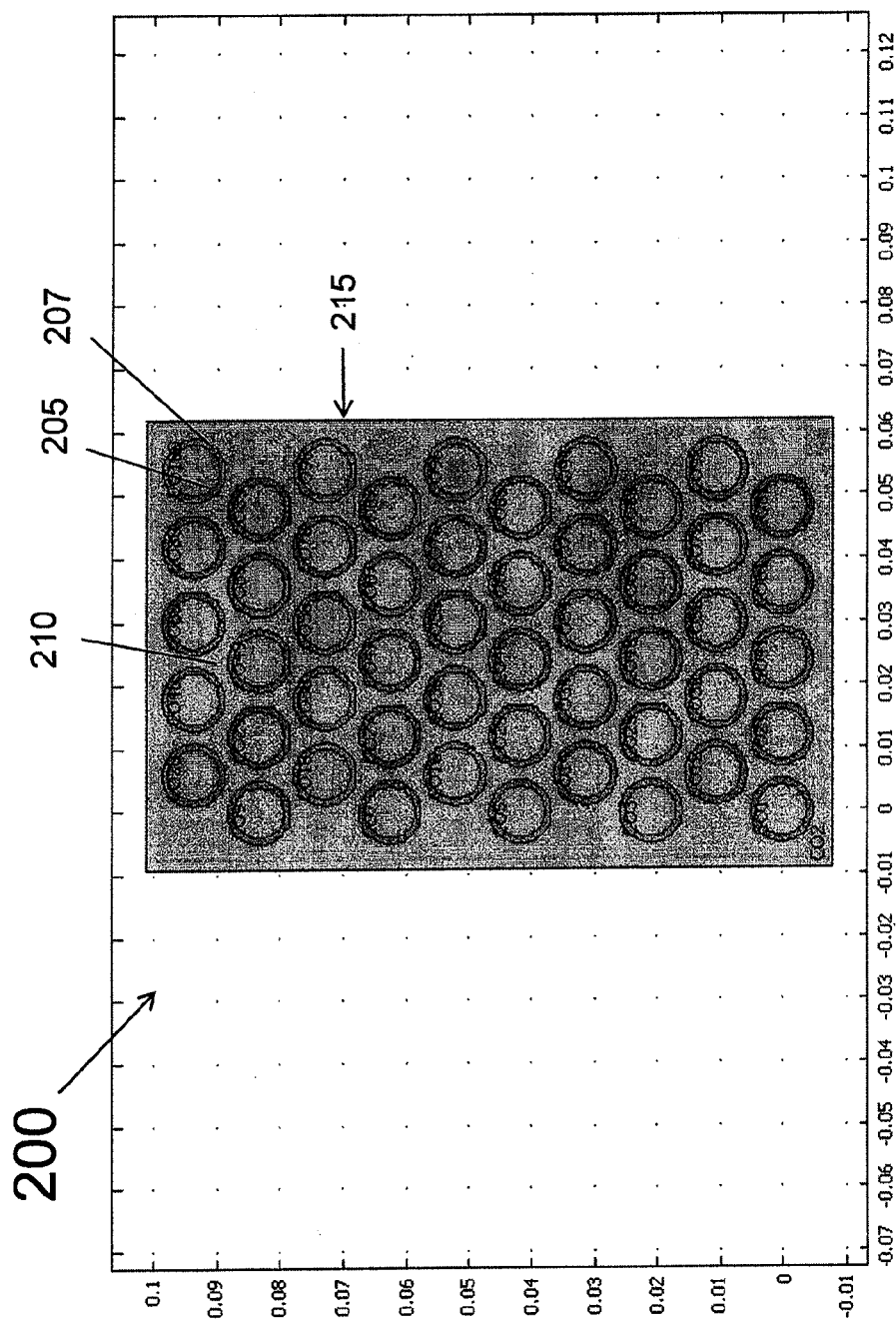
FIG. 2 is a schematic for a water desalination system having a phononic crystal of ceramic tubes.

FIG. 2 is a schematic of a water desalination system 200 having a phononic crystal. The system 200 can be a parallel array of tubes 205 coated with a membrane 207 and packed in a specific arrangement, such as a hexagonal array. The tubes 205 can be manufactured of a porous material. In an embodiment, the tubes 205 are manufactured of a porous ceramic material. The membrane 207 coating the tubes 205 can be a thin layer of polymer such as a desalination polymer. The membrane 207 can allow water molecules to pass through and prevent the passage of the ionic species and dissolved organics (larger molecules) leaving them behind.

The arrangement of porous tubes 205 coated with a desalination polymeric membrane 207 can be packed into a phononic crystal. The tubes 205 can be arranged in parallel configuration or any regular polygon or circular cross-sectional shape. The arrangement of tubes 205 can be packed into a larger tube or container such as a flow chamber 215 having a generally small cross-section. The chamber 215 can be rectangular, a regular polygon, circular or other cross-sectional shape. In one variation, the cross-section of the flow chamber 215 is about 10 cm×6 cm. The chamber 215 can be a metal material.

Water to be desalinated can flow through the interstitial region 210 between the tubes 205 (perpendicular to the diagram) such that the inside of the tubes 205 are initially kept empty. Alternatively, water to be desalinated can flow through the inside of the tubes 205 and the interstitial regions 210 kept empty. The membrane 207 coating the tubes 205 allows fresh water to pass therethrough. Depending upon the configuration of the system 200, the pure water can flow from the interstitial region 210 into and through the tubes 205. Alternatively, the pure water can flow from the tubes 205 into and through the interstitial region 210.

The arrangement of tubes 205 within the chamber 215 can be positioned adjacent to one or more acoustic transducers (not shown). The transducers can be located at one or more boundaries of the flow chamber 215 such that the transducers contact the water to be desalinated. Alternatively, the walls of the chamber 215 can act as the acoustic transducer. The packing arrangement of the tubes 205 can vary as can the number of transducers, their arrangement, and the acoustic frequency selected. In a variation, two adjacent transducers can be selected such that they cover an entire boundary or side of the flow chamber 215.

When these transducers are powered up, such as by an alternating current, they can induce a complex acoustic standing wave in the surrounding tubes 205 due to constructive and destructive interference. Stable nodes of very high-pressure differential can be produced over small spatial areas. By tuning the placement of the tubes 205 and adjusting the resonance frequency of the transducer(s), water molecules can be forced through the membrane 207 and into the empty tubes 205 (or the reverse situation, depending on tuning of the system). Each transducer can operate at a variety of resonances as will be described in more detail below. The membranes 207 can be positioned at these calculated nodes of high pressure differential. Alternatively, the stable nodes of very high-pressure differential can be tuned to the location of where the membranes 207 are positioned.

Figure 3:
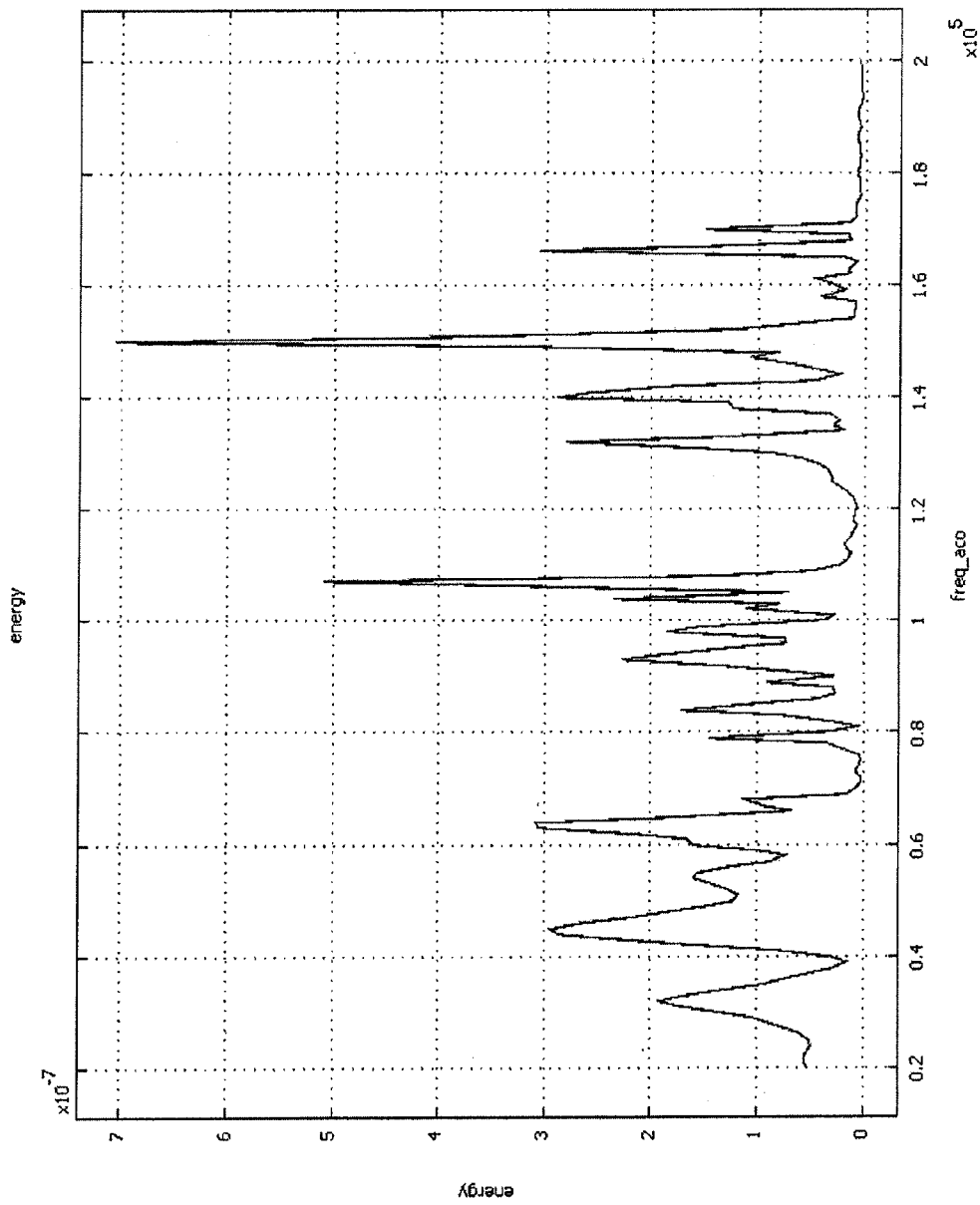
FIG. 3 is an energy gap spectra for the phononic crystal water desalination system shown in FIG. 2.
Figure 4:
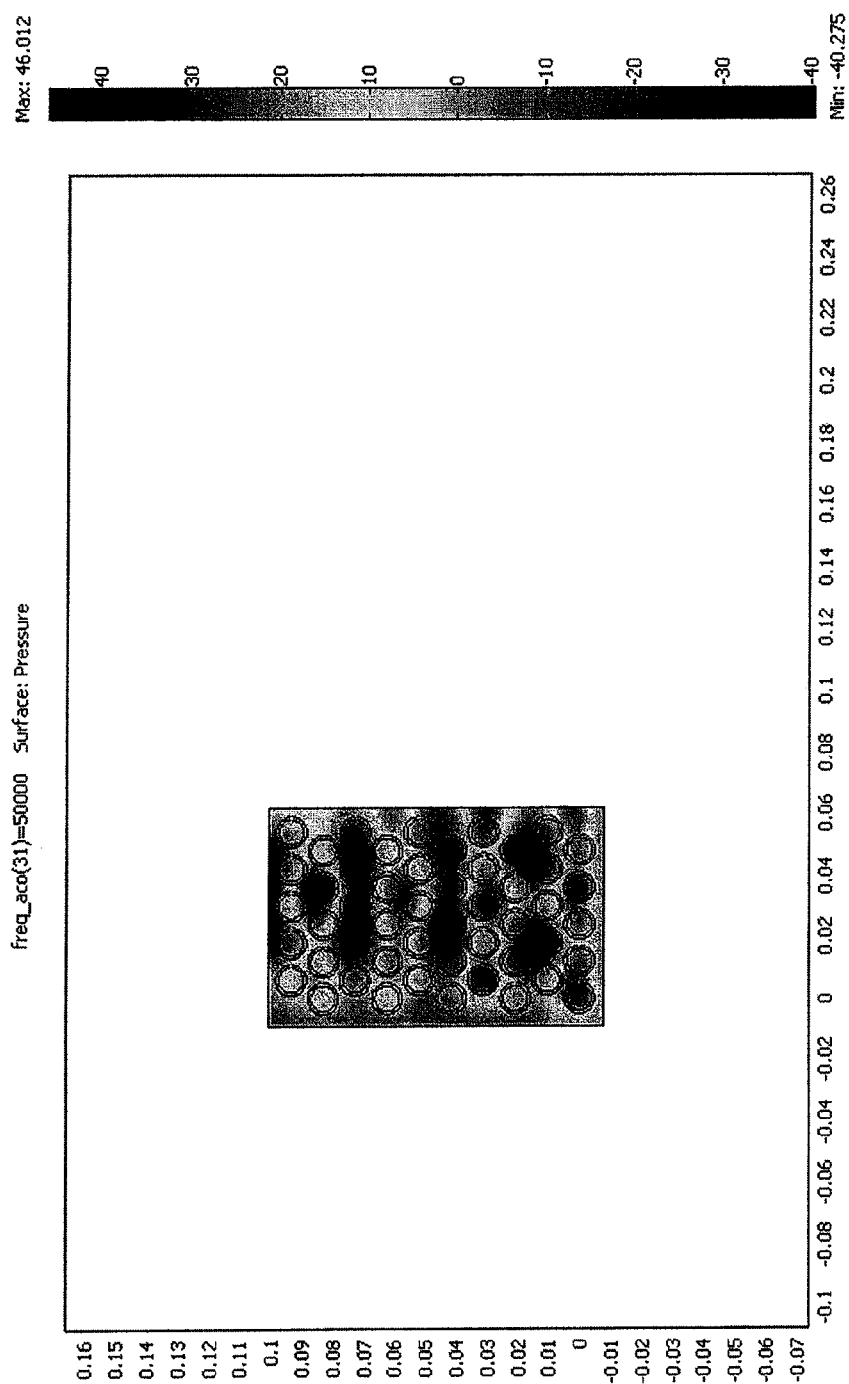
FIG. 4 is a 50 kHz surface plot showing pressure at zero phase angle.

FIG. 3 shows the energy gap spectra for the phononic crystal water desalination system 200 of FIG. 2. FIG. 4 shows the surface pressure in the device when the two transducers are in phase (zero phase angle) and operating at 50 kHz as well as the lines of pressure modulations. Between the red and blue regions the pressure differential can be as high as 200 MPa. In the figure, the pressure units are an arbitrary scale. Optical techniques known in the art can be used to measure pressure of this magnitude where the deflection of a HeNe laser beam indicates refractive index variation from which one can calculate the pressure variation (Higginson et al. "Tunable optics derived from nonlinear acoustic effects", *J Appl. Phys.* 95 (10) 5896-5904 (2004)). This can depend on the input voltage to the transducer.

Figure 5:
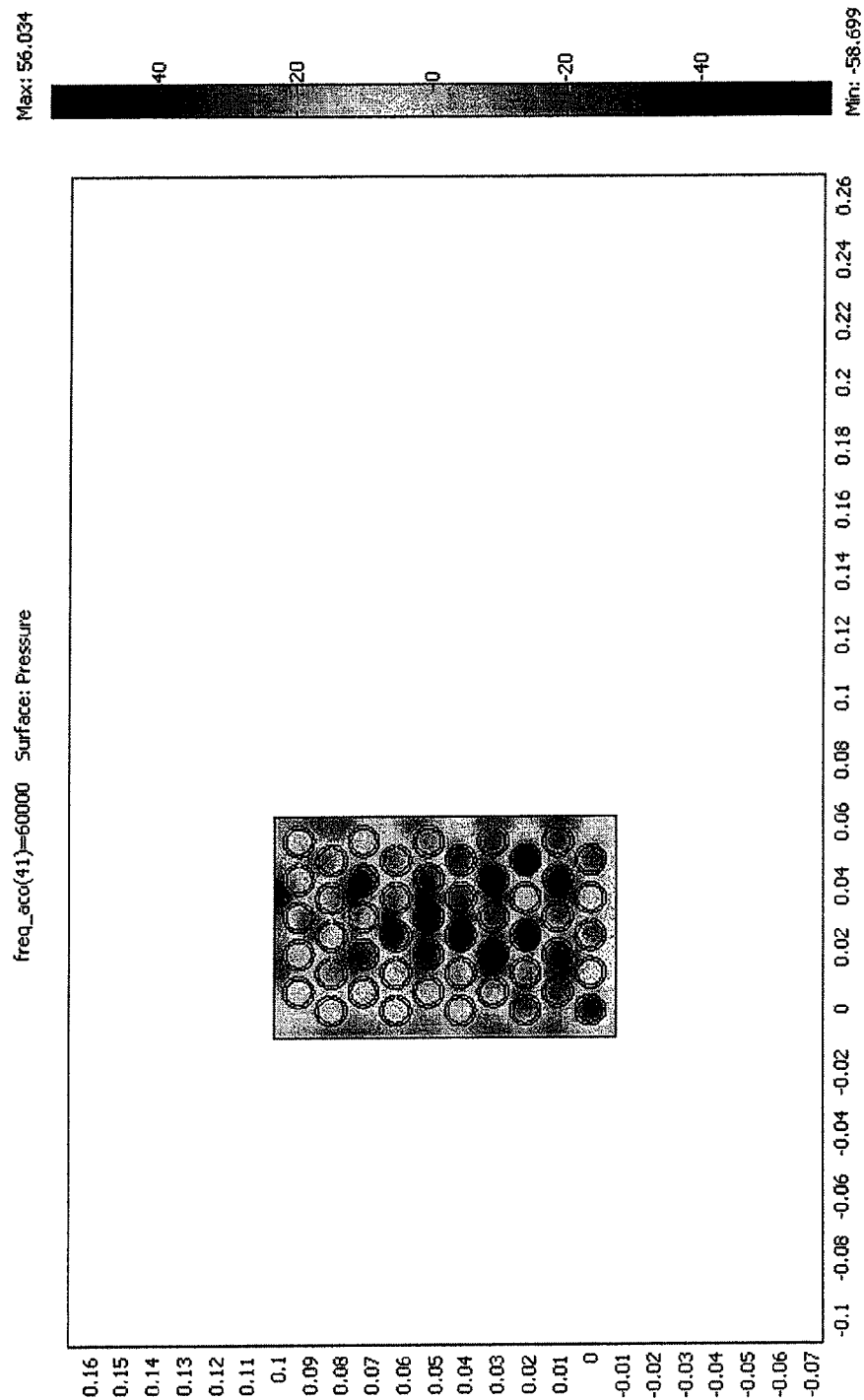
FIG. 5 is a 60 kHz surface plot showing pressure at zero phase angle.
Figure 6:
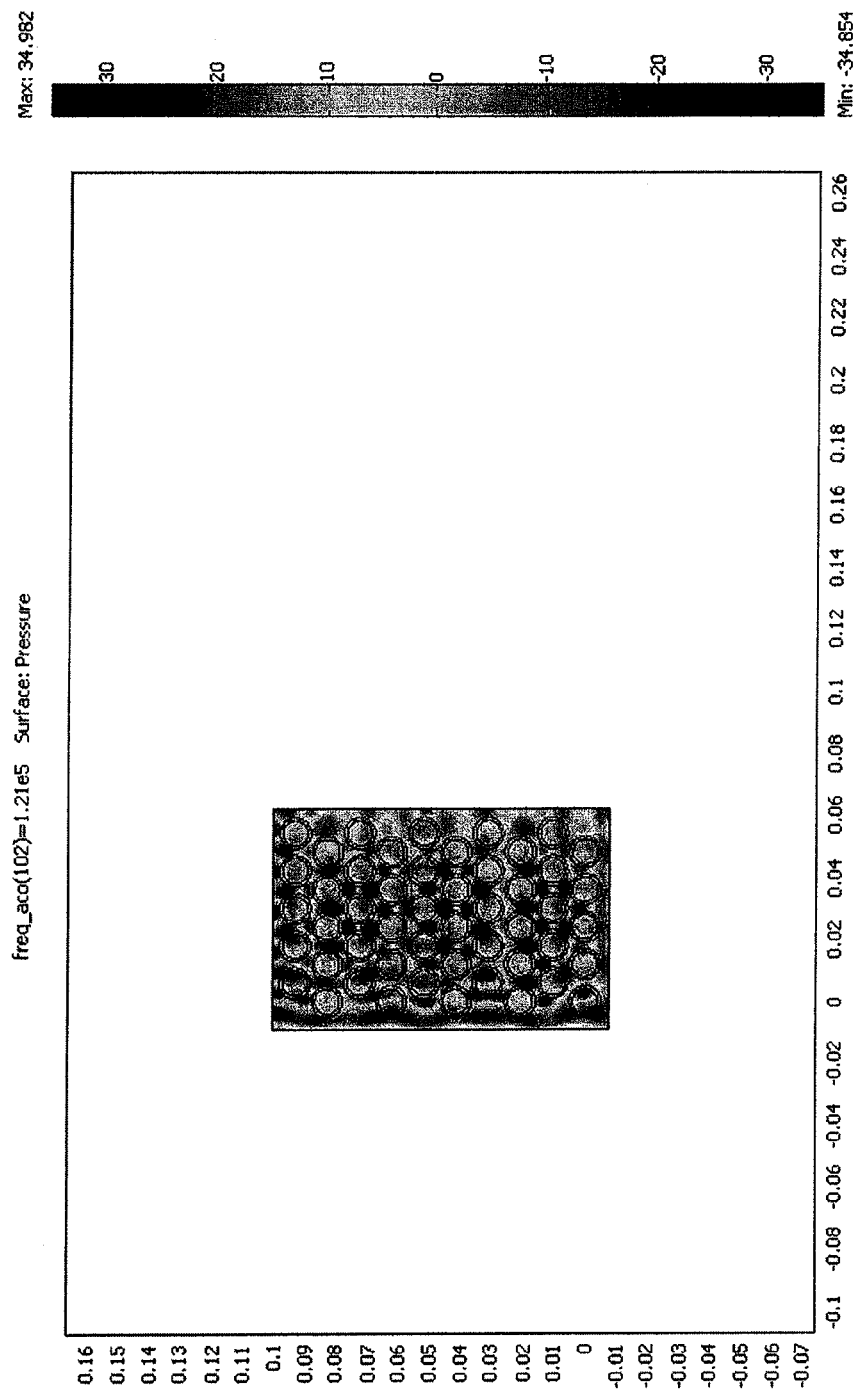
FIG. 6 is a 121 kHz surface plot showing pressure at zero phase angle.

FIGS. 5 and 6 show two different surface pressure plots showing pressure at zero phase angle at frequencies 60 kHz and 121 kHz, respectively. It should be appreciated that a variety of frequencies is acceptable. In a variation, the frequency is below about 150 kHz. In another variation, the frequency is between about 60 kHz and about 150 kHz; between about 70 kHz and about 140 kHz; between about 80 kHz and about 130 kHz; between about 90 kHz and about 120 kHz. In a variation, the frequency is 121 kHz. It is possible to have regions of both high and low pressure within a single tube at the same time. These high-low regions can oscillate in position depending on the phase angle. It should be appreciated that this should be avoided. In an embodiment, lowering the frequency can eliminate such occurrences.

Figure 7:
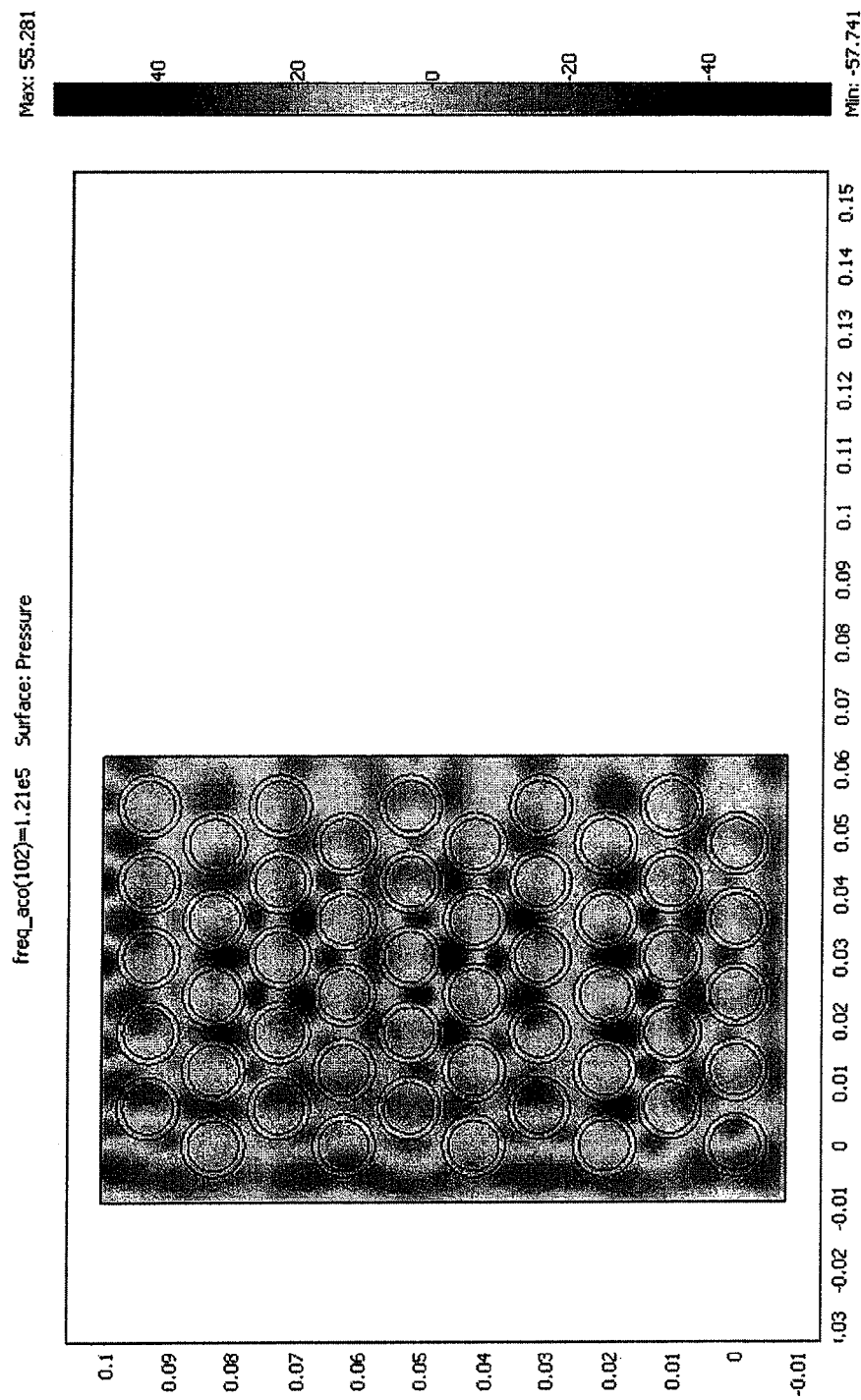
FIG. 7 is a 121 kHz surface plot showing pressure at 0 degrees phase angle and initial pressure of 10 kPa.
Figure 8:
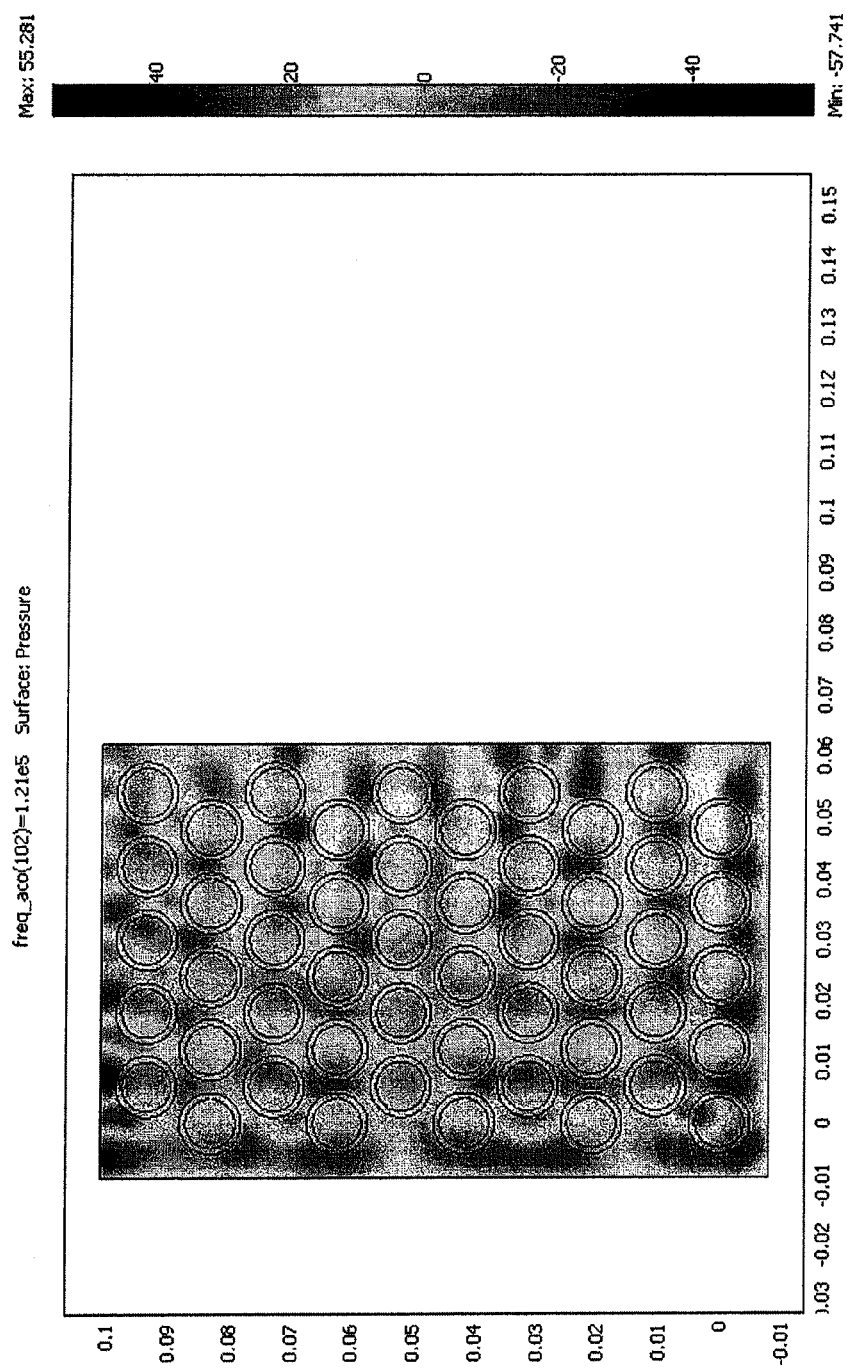
FIG. 8 is a 121 kHz surface plot showing pressure at 90 degrees phase angle and initial pressure of 10 kPa.
Figure 9:
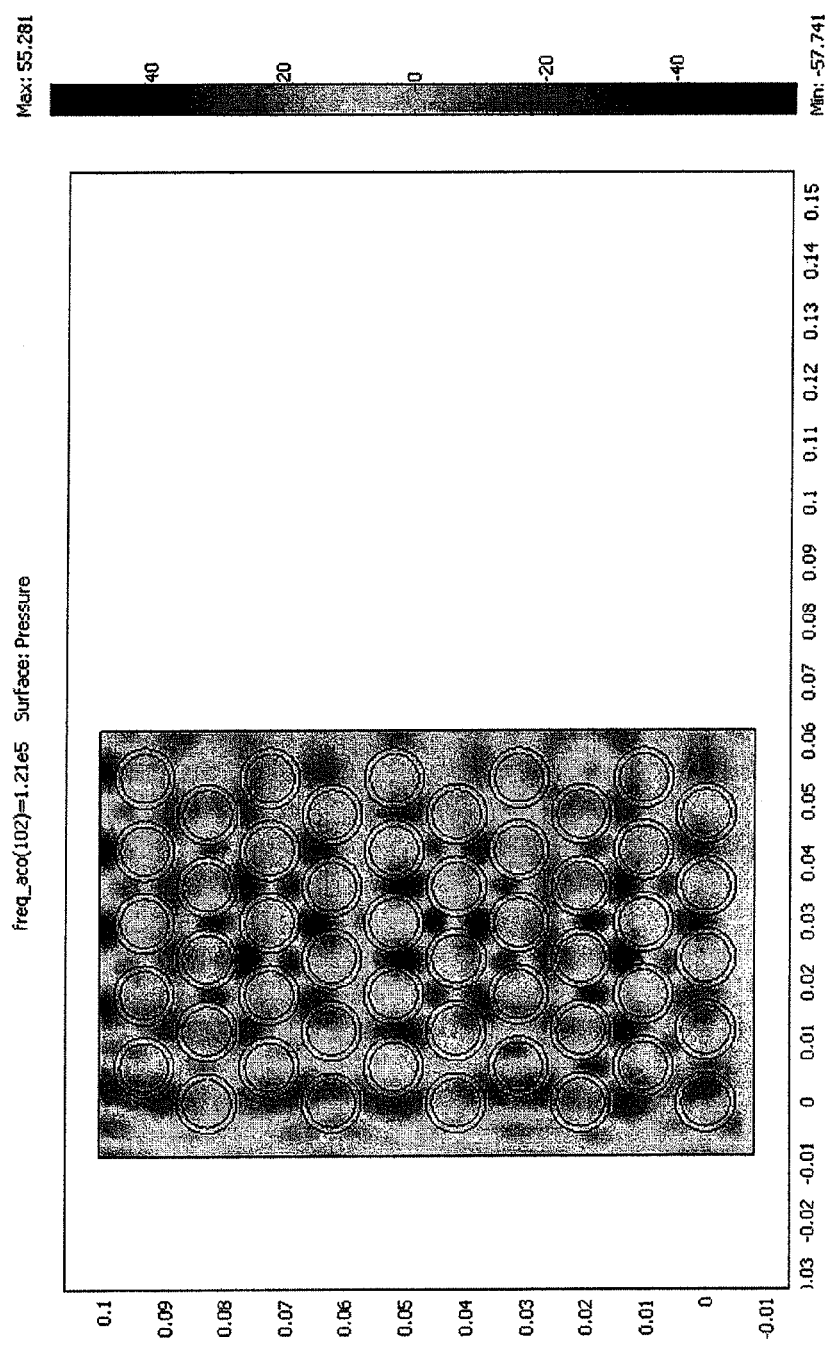
FIG. 9 is a 121 kHz surface plot showing pressure at 180 degrees phase angle and initial pressure of 10 kPa.
Figure 10:
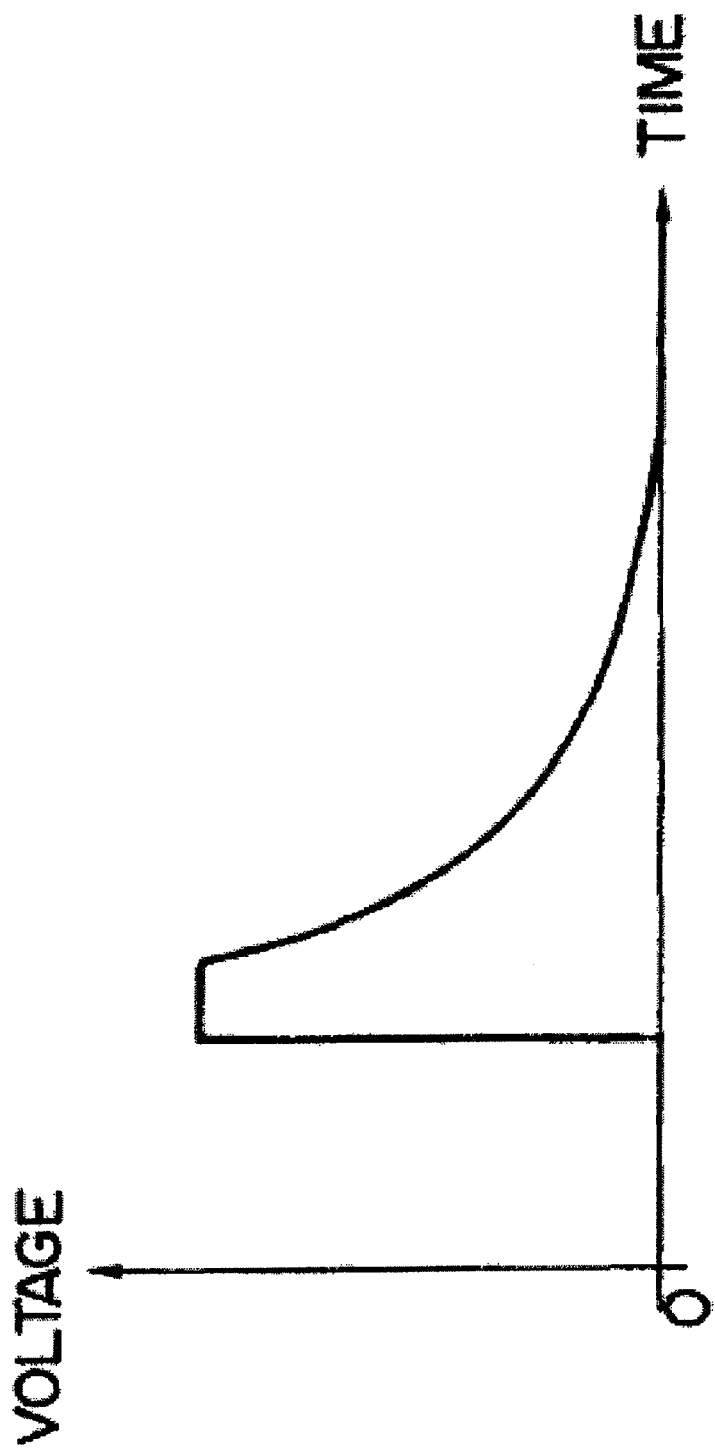
FIG. 10 is a graph showing voltage modulation for the 121 kHz frequency for driving the transducer.

FIGS. 7, 8, and 9 show the phononic crystal of FIG. 2 at 121 kHz and showing pressure at 0, 90, and 180 phase angle, respectively, and initial pressure of 10 kPa. In the 0 phase angle (see FIG. 7), the pattern of positive and negative pressures are opposite of those of the 180 phase pattern (see FIG. 9). The pressure pattern in the 90 degree phase (shown in FIG. 8) is orthogonal to these. In this variation, pure water is on the inside of the tubes 205. Acoustic phase angle problems can be circumvented by filling some tubes with polyurethane and modulated the drive frequency on the transducers. For example, the tubes not specifically designed to be active (i.e. where there is no high or lower pressure node) can be filled with polyurethane acoustic impedance matched to water such that the pattern is not disturbed. To eliminate the opposite phase pressure, which can act as a reverse pump, the drive frequency can be modulated as shown in FIG. 10. This modulated drive can provide a one-way pump action from the acoustics and drive the water molecules through the membrane 207 on the outside of the porous ceramic tubes 205.

While this specification contains many specifics, these should not be construed as limitations on the scope of what is claimed or of what may be claimed, but rather as descriptions of features specific to particular variations. Certain features that are described in this specification in the context of separate variations can also be implemented in combination in a single variation. Conversely, various features that are described in the context of a single variation can also be implemented in multiple variations separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results. Only a few examples and implementations are disclosed. Variations, modifications and enhancements to the described examples and implementations and other implementations may be made based on what is disclosed.

What is claimed is:
1. An apparatus comprising
 (a) an array of circular tubes, wherein each tube is surrounded by a membrane and wherein the tubes are parallel to each other, and the array of circular tubes is embedded in urethane to form a phononic crystal;

(b) a flow chamber; and (c) one or more acoustic transducers, wherein the array of circular tubes is positioned in the flow chamber so that hollow portions of the circular tubes are in a direction of flow, wherein spaces between the circular tubes in the flow chamber form an interstitial region, and wherein the one or more acoustic transducers are located at one or more boundaries of the flow chamber.

2. The apparatus of claim 1, wherein the membrane comprises a desalination polymer.

3. The apparatus of claim 1, wherein the circular tubes are made up of a porous material.

4. The apparatus of claim 1, wherein the array of circular tubes is a hexagonal array.

5. The apparatus of claim 1, wherein a wall of the flow chamber comprises the one or more acoustic transducers.

6. The apparatus of claim 1, wherein the one or more acoustic transducers comprises two acoustic transducers.

7. The apparatus of claim 6, wherein the two acoustic transducers cover an entire boundary or side of the flow chamber.

* * * * *